May 15, 1934.  C. OSENBERG  1,959,214
INDIRECTLY HEATED ELASTIC FLUID GENERATING ARRANGEMENT
Filed Sept. 9, 1932
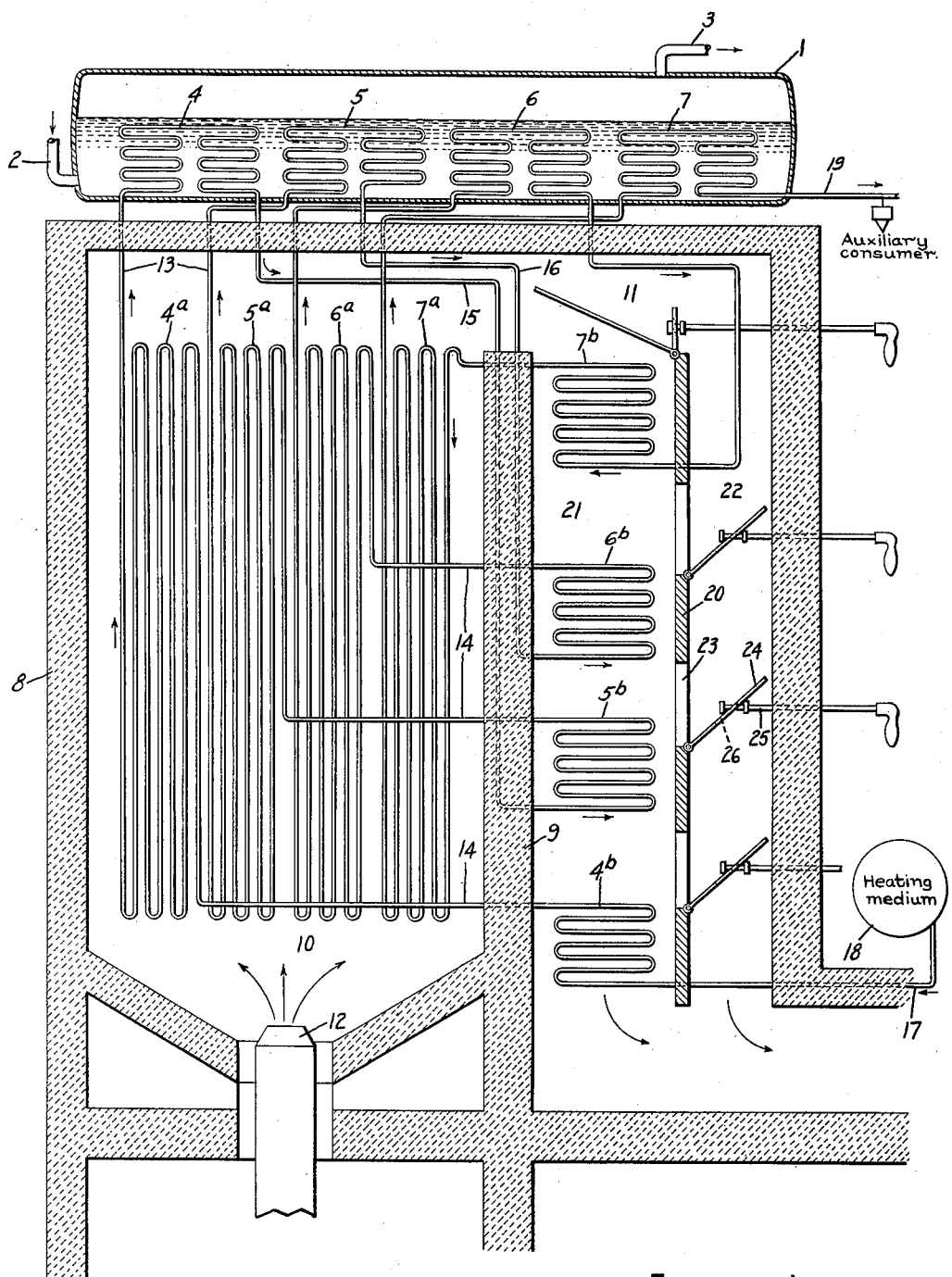
Inventor:
Carl Osenberg,
by Charles E. Tullar
His Attorney.

Patented May 15, 1934

1,959,214

UNITED STATES PATENT OFFICE 1,959,214

INDIRECTLY HEATED ELASTIC FLUID GENERATING ARRANGEMENT

Carl Osenberg, Berlin-Charlottenburg, Germany, assignor to General Electric Company, a corporation of New York Application September 9, 1932, Serial No. 632,385
In Germany September 19, 1931

2 Claims. (Cl. 122—33)

The present invention relates to indirectly heated elastic fluid generating arrangements in which fluid contained in a container or boiler is heated, evaporated, and/or superheated by means of a heating medium which is conveyed or circulated through heating elements arranged within the container or boiler. The heating medium circulated through the heating elements is heated in superheating elements to which heat energy is transmitted by radiation and/or conduction from a source of heat energy, which source may be a combustion chamber or the fire gases leaving a combustion chamber.

The indirect heating arrangement may be such that heating medium is successively passed through groups including one or more superheating elements and a heating element in the boiler. Difficulties have been encountered where these arrangements are subjected to variations in load, as at low load less heat energy is transmitted from the heating elements to the fluid to be heated. The heating medium thereby assumes too high temperatures in the superheating elements which may lead to damage of the latter.

The object of my invention is to provide an improved elastic fluid generating arrangement of the type specified in which the heat transmitted to the superheating elements can be readily regulated in accordance with load conditions.

For a consideration of what I believe to be novel and my invention, attention is directed to the following description and the claims appended thereto in connection with the drawing which forms a part of my specification.

In the drawing I have shown by way of example, partly in section and partly diagrammatic, an indirectly heated elastic fluid generating arrangement in accordance with my invention.

Referring to the drawing, 1 designates a container or boiler for fluid to be heated, evaporated, and/or superheated. 2 is a conduit through which fluid is supplied to the boiler and 3 is an outlet conduit for the heated fluid. Provided within the boiler are one or more heating elements through which a heating medium is passed for transmitting heat energy to the fluid in the boiler. In the present instance I have shown a plurality of heating elements, 4, 5, 6, 7. The heating medium supplied to the heating elements is heated in a superheater or superheaters forming a part of a furnace. In the present example I have shown a furnace having an outer wall 8 and an inner wall 9 dividing the furnace into two chambers or spaces, a combustion chamber or space 10 and a gas chamber or space 11. Provided in the lower part of the combustion chamber 10 is a source of radiant heat energy 12 which may be a pulverulent fuel burner or the like. Provided in the upper part of the combustion chamber are a plurality of superheaters or radiation elements 4a, 5a, 6a, 7a, each having one end connected through conduit means 13 to one end of heating elements, 4, 5, 6, 7, respectively. The heat is supplied to superheaters 4a, 5a, 6a, 7a primarily in the form of radiant energy.

Provided in the gas chamber are a plurality or other superheating or convection elements 4b, 5b, 6b and 7b. Each of these elements has one end connected by conduit means 14 to the inlet of one of the superheaters 4a, 5a, 6a, 7a. Heat is supplied to the superheating elements in the gas chamber primarily through conduction, that is, through the fire gases escaping from the combustion chamber and coming into contact with elements 4b, 5b, 6b and 7b.

With the arrangement so far described the heating elements in the boiler and the superheating elements in the combustion chamber and the gas chamber are connected in series to form groups, each group comprising a heating element in the boiler and a superheating element in each of the chambers. For example, the first group includes elements 4b, 4a and 4 connected in series. All the elements together thus form four groups which are connected in series, that is, the end of the last element of the first group, that is the outlet of heating element 4, is connected by conduit means 15 to the inlet of the second group that is to the inlet of heating element 5b. The outlet of the second group is similarly connected by a conduit 16 to the inlet of the third group, that is to superheating element 6b, etc. Heating medium is supplied through a conduit 17 to the inlet of the first group from a source of supply 18 which may be the intermediate stage of an elastic fluid engine or the like. The heating medium is then circulated successively through the four groups and from the end of the last group it is discharged through a conduit 19 and the remaining heat contained therein may be utilized in auxiliary consumers or the like.

An important feature according to my invention is the provision of means for regulating the amount of heat energy conducted to the superheating elements in the gas chamber whereby the temperature of these elements may be regulated individually or collectively with respect to the elements. This is accomplished, as exemplified in the drawing, by the provision of a wall 20 within the gas chamber dividing said chamber to define a superheating chamber 21 and a channel 22. The wall has a plurality of openings 23, preferably at least one for each superheating element. 24 designates valve means such as baffles for regulating the amount of heat energy supplied to the superheating elements in the gas chamber. These baffles or valves are adjusted through rods or levers 25 having a lost motion connection 26 with the baffle and extending through the wall of the furnace.

During operation the valves are positioned in accordance with load conditions, that is, at high or increased demand for load output of the boiler I open the baffle provided on top of wall 20 for superheating element 7b and close all other baffles. In this position of the baffles all gases escaping from the combustion chamber are passed through the superheating chamber and thereby conduct a maximum amount of heat energy to superheating element 4b to 7b. If the load decreases or if the fluid temperature rises beyond a desired value, I move the baffle provided on top of wall 20 towards closed position with respect to the superheating chamber so that a part of the fire gases only is passed through this chamber and the remaining part escapes through channel 22. From this viewpoint the baffle hinged to the top of wall 20 forms a means for collectively regulating the heat energy supplied to all superheating elements in the gas chamber, whereas the baffles for closing the openings in wall 20 represent means for regulating the heat energy supplied to the individual superheating elements. Thus, for example, if it is desired to supply the least amount of heat energy to superheaters 6b and 7b, this can be readily performed by closing the baffles provided on top of wall 20 and the baffle for the uppermost opening in wall 20 which serves for individually regulating superheating element 6b.

With my invention I have accomplished an arrangement for indirectly heated elastic fluid generators in which the heat submitted by conduction to at least a part of the superheating elements can be easily regulated. The danger of burning through of the superheating elements in the combustion chamber is thereby substantially prevented.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States, is:

1. In an indirectly heated elastic fluid generating arrangement, a boiler containing fluid, a plurality of heating elements in the boiler, a furnace comprising a combustion chamber and a gas chamber, a plurality of radiation elements in the combustion chamber and a plurality of convection elements in the gas chamber, said elements being connected to form groups comprising a radiation element and a convection element connected in series to the inlet of a heating element, the groups being connected in series with the heating element of one group connected to the convection element of another group, means for individually and collectively regulating the heat energy conducted to the convection elements in the gas chamber, and means for supplying a heating medium to the first group.

2. In an indirectly heated elastic fluid generating arrangement, a boiler containing fluid, a plurality of heating elements in the boiler, a furnace comprising a combustion and a gas chamber, a plurality of radiation elements in the combustion chamber and a plurality of convection elements in the gas chamber, said elements being connected to form groups comprising a radiation element and a convection element connected in series to the inlet of a heating element, the groups being connected in series with the heating element of one group connected to the convection element of another group, means for supplying a heating medium to the first group, and means for controlling the flow of heat energy to the convection elements.

CARL OSENBERG.